Jan. 21, 1964 R. E. LOVELL 3,118,971

APPARATUS FOR RECORDING IMAGES

Filed Jan. 6, 1961

INVENTOR.
Ralph E. Lovell

BY J. L. Whittaker

ATTORNEY

United States Patent Office 3,118,971
Patented Jan. 21, 1964

3,118,971
APPARATUS FOR RECORDING IMAGES

Ralph E. Lovell, Los Angeles, Calif., assignor to Radio Corporation of America, a corporation of Delaware Filed Jan. 6, 1961, Ser. No. 81,091
9 Claims. (Cl. 178—7.4)

The present invention relates to the photographic recording of luminous images, and more particularly to a novel method of and apparatus for photographically recording images produced by television methods, or other images recurring at a definite rate, without the possibility of imperfect matching of the record on certain film frames, and with a maximum realization of full vertical resolution of the produced image. The novel apparatus employs a novel shutter device and its accompanying optical arrangement.

It is desirable to photographically record images of television programs, whether "live" or prerecorded on magnetic media, for future use as program material, as well as for preservation to serve as a record of transmitted subject matter. There is now a great demand for the transfer of television program material from video tape recordings to photographic film. This photographic recording is usually effected by photographic methods on a light sensitive medium, such, for example, as a motion picture film. A television image is produced by a moving scanning spot which traverses a viewing field to create or produce a visual image. This scanning spot is provided by a focused and modulated cathode ray beam in a cathode ray tube. In accordance with present day television methods, a viewing field is scanned a plurality of times, twice for example, to produce an interlaced frame. Between each scan, the cathode ray beam is blanked to mask beam retrace. Sound motion picture equipment operates at a standard frame frequency of 24 frames per second, for example. Complete television images are produced under current standards at a frame frequency of 30 per second, and where multiple scanning is employed, for example, double interlaced scanning of each field occurs at twice this frequency.

In accordance with the present invention, film frames are presented for exposure in such a manner that during the time of presentation of each and every pair of film frames, two complete TV images comprising four TV fields are recorded. The film motion is synchronized with the television scanning whereby a pair, for example, of film frames are advanced during a "pull-down" period at which time the optical path between the cathode ray tube and the film is blocked. Also, the time of pull-down is synchronized to occur precisely between two adjacent vertical blanking intervals, and, therefore, apparatus embodying the present invention eliminates imperfect matching of the record on certain film frames either in the form of overlap with consequent double exposure or an omission of a band of the image. The defect in the produced record, just referred to, which is eliminated by the present invention, occurs as a pronounced flicker in alternate film frames and is known as "shutter bar" or "splice line." Prior to the present invention efforts have been made to eliminate "shutter bar" in various ways. One prior attempt to eliminate "shutter bar" involved changing the mechanical shutter of a motion picture camera. This was done at the sacrifice of one half of the vertical resolution of the television image thereby degrading the quality of the recording, which is therefore deemed unsuitable for television broadcasting or for high quality screen projection. Another approach to elimination of "shutter bar" has been electronic circuitry by which the television image on the face of the kinescope is electronically keyed off while the film in the camera is advanced to the next film frame. However, the results have been erratic.

More in detail, and still in accordance with the present invention, a unique and novel motion picture camera is provided which utilizes two substantially identical film apertures, displaced, for example, one above the other with two alternate optical paths for recording the interlaced images. The camera pull-down mechanism functions only twelve times per second, when recording an image produced in accordance with present television standards as mentioned in the foregoing. The pull-down mechanism functions twelve times per second as stated and pulls down two film frames during the presentation of each fifth television field. The novel shutter referred to above rotates at the rate of 720 r.p.m. and possesses one 144° segment which has a front surfaced mirror set at an angle of 45° with respect to light arriving from the kinescope tube through a conventional lens system. The light from two television fields is deflected for exposure of one of the two film frames positioned by the pull-down mechanism. Then the shutter is open for $\frac{1}{30}$ second permitting light from two television fields to expose the other film frame positioned by the pull-down mechanism. At the occurrence of and during vertical blanking, an opaque section of the rotating shutter excludes all light from the kinescope directed to the film. The period of light exclusion endures for one television field. At this time, pull-down occurs. Thus, there is no possibility of the existence of the shutter-bar defect.

The rotating shutter can be phased in known manner with the alternating current power supplied to the camera motor or motors and also with the blanking pulses of the television pictures to be recorded. This phasing functions in such a way as to always open or close the camera aperture during vertical blanking time when there is no active picture present, there is never any discontinuity in the film exposure to the TV picture, hence, as pointed out above, there can be no shutter-bar or splice line flicker produced.

The above condition applies in all cases where the same alternating power source is driving the kinescope recording camera and also controlling the frequency of the synchronizing generator associated with the television pictures to be recorded. This situation normally prevails where all of the television equipment is in the same physical plant.

In those cases where the television synchronizing generator is operating at a frequency other than that of the local alternating current power for example, when it is operating on crystal control at color television frequencies, it will then become necessary to derive alternating current camera power from a generator whose frequency is controlled by the synchronizing generator crystal frequency. This can be done by available equipment.

The principal object of the present invention is to provide a novel method of and apparatus for recording images recurring at a definite rate with no possibility of shutter bar or splice line defects.

Another object of the present invention is to provide a novel exposure sequence of television images for presentation to a recording medium in a novel manner.

Still another object of the present invention is to insure, in a film recording system of television images that complete exposure of a film frame occurs without interruption of a normal television field scanning sequence.

A further object of the present invention is to provide novel methods of and apparatus for timing the exposure of a pair of photographic film frames whereby to record a complete television image on each one of the pair of film frames during the time of operation of television apparatus in producing the equivalent of a television frame.

Other objects and advantages of the present invention will, of course, become apparent and immediately suggest themselves to those skilled in the art to which the invention is directed from a reading of the following specification in connection with the accompanying drawing in which.

Figures 1, 2, 3:
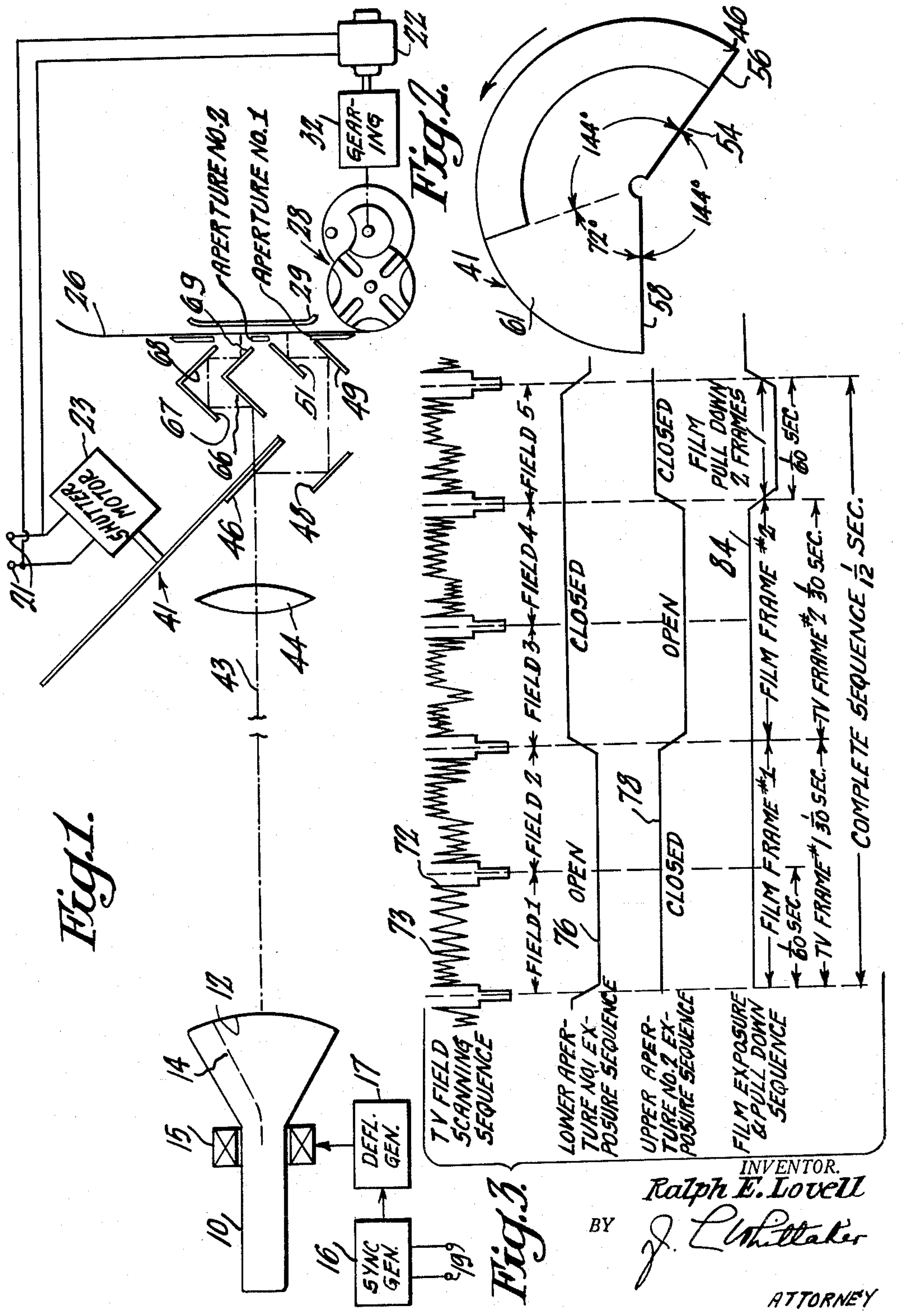
FIG. 1 shows, diagrammatically, apparatus in accordance with the present invention recording television images.
FIG. 2 is a view in plan of the novel shutter of this invention.
FIG. 3 is a time scale diagram illustrating the relationship between television image production and exposure times of the recording medium.

Referring to FIG. 1 of the drawing, reference character 10 indicates a television image producing device shown illustratively as a cathode ray tube, upon the target end 12 of which television images are produced.

A deflection yoke 15 causes the image modulated beam 14 to be swept over the tube end 12 along spaced scanning lines. In accordance with the usual practice, alternate lines are traced by each complete sweep of the beam 14. The output of the sync generator 16 is employed to control horizontal and vertical deflection waveforms produced by the deflection generator 17. Terminals 19 are, or may be, connected to the local sixty cycle power supply. Terminals 21 are, or may also be, connected to the motors 22 and 23, later to be described. As pointed out above, the terminals 19 and 21 may be connected to a power source which is provided with local frequency control, the control frequency being obtained from a crystal controlled oscillator.

The images to be recorded in accordance with the invention are photographed on a film strip 26. This may be the usual motion picture film, either 35 millimeter (mm.), 16 mm., or any size. The optical system and optical parts to be discussed can be of a nature to suit the film size in view of the teachings herein. The camera which records these images in accordance with the present invention may comprise an intermittent pull-down mechanism 28. The intermittent mechanism 28 is shown, illustratively, as being of the Geneva movement type. However, a claw type pull-down may be used instead. In accordance with the invention, the pull-down moves two film frames at a time each one twelfth of a second. The intermittent mechanism 28 is driven by the motor 22 which is of the type operating at substantially constant speed. Gearing 32, which is indicated conventionally, is provided to suit the speed of operation of the intermittent mechanism 28 to the normal speed of the motor 22.

The previously mentioned shutter of the present invention, designated in its entirety by reference character 41, is shown more in detail by FIG. 2 of the drawing. It will be understood that any suitable mechanical, connection, for example a hub (not shown), may be made to the shaft of the shutter motor 23. The hub connection may, or preferably does, include a means for initially mechanically phasing the shutter 41 in an angular position on the shaft of the motor 23 so that conditions in accordance with this invention will be satisfied with respect to the cycling diagram of FIG. 3. In the illustrative example of FIG. 1, the plane of the shutter is inclined 45° with respect to the line 43 which may be regarded as the optical axis of the system and of the lens 44. The latter may be conventional and it is especially to be noted that it is common to two identical and alternate optical paths directed to two identical film apertures, one above the other.

The first optical path is provided by a mirrored surface 46 (FIG. 2) on the face of the shutter 41. This mirrored surface extends through an arc of 144°. The width of the mirrored surface will depend somewhat upon the projected area of the optical path provided by the mirrored surface 46, a mirror 48, a mirror 49, and a mirror 51. This optical path directs light from the cathode ray tube through camera aperture No. 1 through which it falls onto a frame of the film strip 26.

The second optical path is uncovered and made available by an open sector 54 which extends between the edge 56 of the sector which carries the mirrored surface 46 and the edge 58 of an opaque sector 61. The open sector 54 extends through an arc of 144°. Light from the kinescope which passes through the open sector 54 when it is appropriately in position is reflected by mirrors 66, 67, 68 and 69, through camera aperture No. 2 onto another frame of the film strip 26. It is to be noted that there has been described, in accordance with the invention, an alternate optical system and a mechanical shutter which has the marked advantage of using a single lens which produces identical light transmission for both apertures of the double aperture film camera and, therefore, identical exposure of the motion picture film in the two apertures.

Referring now to FIG. 3 of the drawing, the corresponding television and film frame rate relationships are set forth on a time scale. The television field scanning sequence shows a successive set of five fields, which, in usual television practice, constitutes two and one-half television frames. Vertical blanking intervals are designated 72 on the curve 73. No attempt has been made to indicate horizontal blanking and horizontal sync. The curve 76 indicates the exposure sequence for the No. 1 aperture.

Throughout the curves, slanted lines occur between adjacent portions to indicate recognition that a brief period of time is actually required to accomplish a complete closure or opening of the aperture. This is of no significance since it occurs during the vertical blanking period at which time no light is being emitted from the cathode ray tube. Exposure of the frame in aperture No. 1 occurs during the first two fields by reason of appropriate positioning of the mirrored surface 46 if the shutter rotates. The curve 78 indicates the exposure sequence for the No. 2 aperture. Exposure of the frame in aperture No. 2 occurs during the third and fourth fields by reason of appropriate positioning of the open sector 54 of the shutter 41. It will be seen from the curve 84 that two complete frames have been exposed on the film strip and that one full field time is available for pull down. This occurs since aperture No. 2 is closed by the portion of the shutter 41 which carries the mirrored surface and aperture No. 1 is closed because of the positioning of the opaque sector 61.

It is believed that operation of the illustrative example of a system involving the present invention will be fully understood from the foregoing, particularly in view of the pictorial representation of FIG. 2 which shows the timing relationship. However, to briefly summarize the operation, the camera pull-down mechanism functions only 12 times per second and pulls down two frames of film during each fifth television field. The shutter 41 rotates at the rate of 720 r.p.m. The presence of the front surface mirror deflects light from two television fields to aperture No. 1 of the camera for exposure of one film frame. Concurrently with the vertical blanking, the shutter is removed, because of the presence of open sector 54, for 1/30 of a second permitting light from two television fields to expose the film frame in aperture No. 2. Concurrently with the occurrence of vertical blanking the opaque section 61 of the shutter 41 excludes all light from the film during one television field. This time is available for pull-down of two film frames. Because of this cycle of operations no shutter bar can exist.

What is claimed is:

1. Apparatus for recording images occurring in successive periods of time on successive frames of film comprising means for advancing a pair of said film frames into a position during one of said successive periods of time, means for keeping said pair of frames fixed in said position during two of said pairs of successive periods of time successive to said one successive period of time, and an optical path controlling means for exposing the first of said frames to the first pair of said successive pairs of successive periods of time and for exposing the second of said film frames to the second pair of said successive pairs of successive periods of time, and said path controlling means comprising an element interposed between said images and said frame positions, and means for moving said element in synchronism with said successive periods of time, said element having a mirrored portion, an open portion, and a light blocking portion whereby one optical path between the images and the first film frame of the pair of film frames is by way of said open portion, another optical path between the images and the second film frame of the pair of film frames is by way of reflection from said mirrored portion, and the light blocking portion interrupts light from said images to said film frames during said film advancing period.

2. Apparatus for recording images occurring in successive periods of time on successive frames of film comprising means for advancing a pair of said film frames into a position during one of said successive periods of time, means for keeping said pair of frames fixed in said position during two of said pairs of successive periods of time successive to said one successive period of time, and an optical path controlling means for exposing the first of said frames to the first pair of said successive pairs of successive periods of time and for exposing the second of said film frames to the second pair of said successive pairs of successive periods of time, said path controlling means comprising an element interposed between said images and said frame positions, and means for rotating said element in synchronism with said successive periods of time, said element having a mirrored sector, an open sector, and a light blocking sector whereby one optical path between the images and the first film frame of the pair of film frames is by way of said open sector, another optical path between the images and the second film frame of the pair of film frames is by way of reflection from said mirrored sector, and the light blocking sector interrupts light from said images to said film frames during said film advancing period.

3. Apparatus for recording images occurring in successive periods of time on sucessive frames of film comprising means for advancing a pair of said film frames into a position during one of said successive periods of time, means for keeping said pair of frames fixed in said position during two of said pairs of successive periods of time successive to said one successive period of time, and an optical path controlling means for exposing the first of said frames to the first pair of said successive pairs of successive periods of time and for exposing the second of said film frames to the second pair of said successive pairs of successive periods of time, said path controlling means comprising a disk interposed between said images and said frame positions, and means for rotating said disk in synchronism with said successive periods of time, said disk having a mirrored sector, an open sector, and a light blocking sector whereby one optical path between the images and the first film frame of the pair of film frames is by way of said open sector, another optical path between the images and the second film frame of the pair of film frames is by way of reflection from said mirrored sector and the light blocking sector interrupts light from said images to said film frames during said film advancing period.

4. Apparatus for recording images occurring in successive periods of time on successive frames of film comprising means for advancing a pair of said film frames into a position during one of said successive periods of time, means for keeping said pair of frames fixed in said position during two of said pairs of successive periods of time successive to said one successive period of time, and an optical path controlling means for exposing the first of said frames to the first pair of said successive pairs of successive periods of time and for exposing the second of said film frames to the second pair of said successive pairs of successive periods of time, said path controlling means comprising a disk interposed between said images and said frame positions, and means for rotating said disk in a plane at 45° to the axis of said optical path of said image in a synchronism with said successive periods of time, said disk having a mirrored sector, an open sector, and a light blocking sector whereby one optical path between the images and the first film frame of the pair of film frames is by way of said open sector, another optical path between the images and the second film frame of the pair of film frames is by way of reflection from said mirrored sector and the light blocking sector interrupts light from said images to said film frames during said film advancing period.

5. Means for recording periodically produced luminous images comprising means for recording photographically a plurality of images constituting two sets of images, on two series of frames of a photographic film, each series having alternately presented frames, means for photographically recording one set of images on one of said series of frames including means for projecting one of said sets of images along an optical path including a first aperture, means for photographically recording said other set of images including means for projecting said other set of images on said other series of frames including means for projecting said other set of images along a second optical path including a second aperture, said first and said second named optical paths each having a portion which coincides with and is common to both of said paths, and means in the common portion of said optical paths for producing identical light transmission for both of said apertures.

6. Apparatus for recording luminous television images including means for periodically producing said images and means to present a series of frames of a photographic film to receive said luminous images, each image corresponding to one field of alternate fields of a television frame, said apparatus comprising lens means for projecting a plurality of fields from said image producing means along an optical path including a first aperture on said series of frames of photographic films to record said fields on said film frames, means including said lens means for projecting a second plurality of fields from said image producing means along a second optical path including a second aperture to record said second plurality of fields on said film frames whereby said first and second optical paths each have a portion including said lens means which coincides with and is common to both of said paths for producing identical light transmission for both of said apertures.

7. Means for recording periodically produced luminous images comprising, means for projecting a plurality of images, constituting a first set of images, along a first optical path onto a series of frames of a photographic film, means including a first aperture for recording said first set of images on said series of film frames, means for projecting another plurality of images, constituting a second set of images, along a second optical path onto another series of frames of said photographic film, means including a second aperture for recording said second set of images on said other series of film frames, said first and second optical paths each having a portion which coincides with and is common to both of said paths, and means in the common portion of said optical paths for producing identical light transmission for both of said apertures.

8. Means for recording periodically produced television images, each image corresponding to one field of alternate fields of a television frame, said recording means comprising, means for projecting a plurality of images of odd-numbered ones of said fields along a first optical path onto a series of frames of a photographic film, means including a first aperture for recording said odd-numbered field images on said series of film frames, means for projecting a plurality of images of even-numbered ones of said fields along a second optical path onto another series of frames of said photographic film, means including a second aperture for recording said even-numbered field images on said other series of film frames, said first and second optical paths each having a portion which coincides with and is common to both of said paths, and lens means in the common portion of said optical paths for producing identical light transmission for both of said apertures.

9. Apparatus for recording periodically produced luminous images, the production of each image being followed by a blanking interval, said apparatus comprising, means for projecting a plurality of images, constituting a first set of images, at the beginning of a blanking period along a first optical path onto a series of frames of a photographic film, means including a first aperture for recording said first set of images on said series of film frames, means for projecting another plurality of images, constituting a second set of images, at the beginning of a blanking period along a second optical path onto another series of frames of said photographic film, means including a second aperture for recording said second set of images on said other series of film frames, said first and second optical paths each having a portion which coincides with and is common to both of said paths, means including a single lens in the common portion of said optical paths for producing identical light transmission for both of said apertures, and means for suspending said recording process at the beginning of a blanking period periodically during recording.

References Cited in the file of this patent

UNITED STATES PATENTS

| | | |
|---|---|---|
| 2,329,624 | Kellog | Sept. 14, 1943 |
| 2,982,171 | Debrie | May 2, 1961 |
| 3,014,090 | Bartley | Dec. 19, 1961 |

FOREIGN PATENTS

| | | |
|---|---|---|
| 715,635 | Great Britain | Sept. 15, 1954 |
| 780,066 | Great Britain | July 31, 1957 |

OTHER REFERENCES

Journal of the SMPTE, "An Electronic Film Combination Apparatus for Motion-Picture and Television Production," by Caddigan and Goldsmith, vol. 65, January 1956, pp. 7–15.